July 25, 1933.   P. DAVIS   1,920,065
METHOD OF SURFACE FINISHING ARTICLES MADE OF HYDRAULIC CEMENT MIXTURES
Filed Oct. 10, 1932
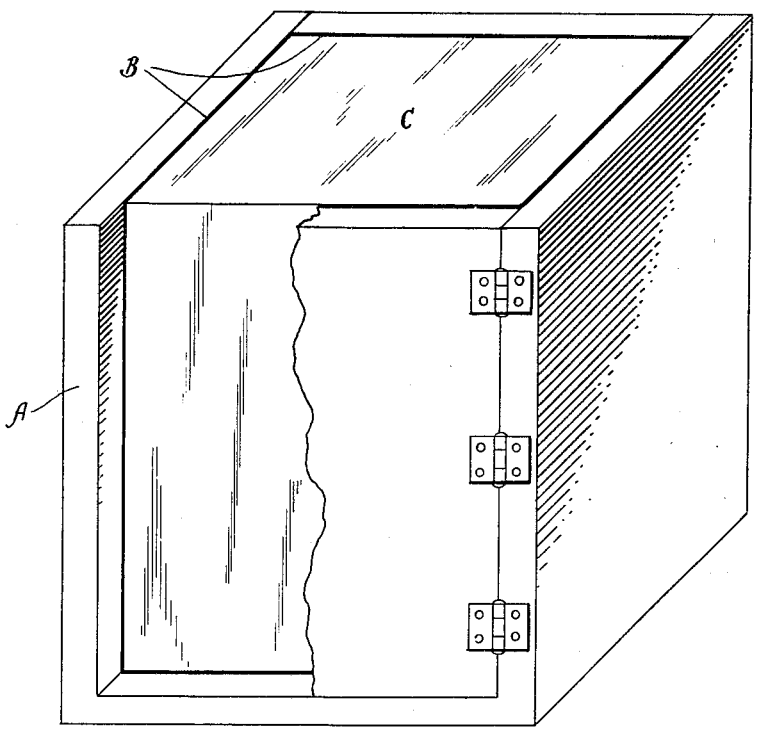
Putnam Davis.
INVENTOR
BY
Ritter, Mechlin & O'Neill
ATTORNEYS Patented July 25, 1933

1,920,065

UNITED STATES PATENT OFFICE

PUTNAM DAVIS, OF NEW YORK, N. Y.

METHOD OF SURFACE FINISHING ARTICLES MADE OF HYDRAULIC CEMENT MIXTURES

Application filed October 10, 1932. Serial No. 637,201.

This invention relates to a novel method of producing articles, made from or including in their exposed surfaces hydraulic cement or mixtures containing the same, having glossy, enamel-like surfaces that are relatively hard, wear resisting and moisture-proof as compared with the body portions of the articles, which comprises casting or applying the cement mixture in contact with surfaces containing a bituminous material, such as tar or asphalt.

The accompanying drawing, which is a perspective view, partly broken away, showing a mold and a cement casting therein, is illustrative of a simple form of application of the invention.

In the art of casting or molding hydraulic cement concrete articles, objects and structures to secure relatively smooth surfaces thereon, it has been the practice to employ molds or forms made, in whole or in part, of materials having coordinately smooth surfaces, such as glass, surface finished wood, metal and composition lumber. In so far as the production of relatively smooth surfaces on the concrete products is concerned, this practice has been more or less successful, but, in most cases, the expense of constructing molds or forms of these materials has been prohibitive, more especially when the concrete products have been of large dimensions, such as building and engineering structures. Furthermore, the articles so produced differ from similar articles, cast in the usual molds or forms, only in the relative smoothness of the surfaces, no other physical or structural changes in the smooth finished surfaces being apparent.

According to the present invention, the articles cast or formed from hydraulic cement mixtures will have their surfaces or any desired portions of their surfaces presenting the effect of a glaze resembling a vitreous enamel, said surfaces possessing many of the characteristics of a vitreous coating, such as resistance to abrasion, imperviousness to moisture, and a uniformly smooth glaze-like texture.

This result is obtained by casting or forming the hydraulic cement mixtures in contact with surfaces containing a bituminous material, such as tar or asphalt, said bituminous material preferably being of a character that is solid at ordinary atmospheric temperature. In the practical application of the method, those portions of the forms or molds which are to impart a glaze-like finish to the product are coated with the bituminous material, which latter may be applied in molten condition and permitted to dry, after which the hydraulic cement mixture is supplied to the form or mold and permitted to set. It has been found that the hard tar or asphalt shows little tendency to adhere to the finished articles made from the hydraulic cement mixture, whether the latter be neat cement mixed with water or an ordinary concrete mixture including the usual proportions of hydraulic cement, mineral aggregate and water and, furthermore, that any adhering tar or asphalt may be readily chipped or broken away from the surfaces of the finished product. The bituminous material may be applied to the surfaces of the forms or molds by dipping, painting or by spraying and, after the proper molding or forming of the product has been completed, the bituminous material adhering to the surfaces of the mold or form may be salvaged for further use, either by chipping the adhering material from the mold surfaces or tapping the portions of the mold which have been coated with a hammer or the like. The tar employed is preferably any of the tars which are solid at ordinary atmospheric temperatures, are frangible and present smooth glossy surfaces. The asphalt used to coat the mold or form surfaces may be natural asphalt or residual asphalt which has the aforementioned characteristics of tar.

As exemplifying the application of the invention in the production of a concrete block having smooth, glossy, enameled or glaze-like surfaces, the drawing shows a mold A having its inner surface provided with a coating B of bituminous material, that is solid at ordinary atmospheric temperatures, such as tar or asphalt, so that all of the surfaces of the casting block C which are formed in contact with coated surfaces of the mold have a glaze or enamel-like finish, as contradistinguished from the smooth finish produced by molds having glass or polished metal surfaces.

It is to be noted that the coating of bituminous material may be applied to the surfaces of molds made of any of the usual materials, such as rough undressed lumber, metal or wood substitutes, which, together with the coating material may be recovered for subsequent use. It has been found that a relatively light or thin coating of the bituminous material applied to the mold surfaces in a molten or fluid state and allowed to set up or harden will be entirely effective in imparting to the surfaces of the articles formed from the hydraulic cement mixtures the glaze-like finish aforesaid.

What I claim is:

1. The method of producing articles formed from hydraulic cement mixtures with glossy enamel-like surfaces, which comprises casting the mixture in contact with surfaces consisting of bituminous material.

2. The method of producing articles formed from hydraulic cement mixtures with glossy enamel-like surfaces, which comprises casting the mixture in contact with surfaces consisting of tar.

3. The method of producing articles formed from hydraulic cement mixtures with glossy enamel-like surfaces, which comprises casting the mixture in contact with surfaces consisting of asphalt.

4. The method of producing article formed from hydraulic cement mixtures with glossy enamel-like surfaces, which comprises casting the mixture in contact with surfaces consisting of bituminous material that is solid at ordinary atmospheric temperatures.

5. The method of producing glossy enamel-like surfaces on structures of cast or molded hydraulic cement mixtures, which comprises coating the corresponding surface or surfaces of the mold or form with a bituminous material and pouring the cement mixture into the form or mold, permitting the mixture to set, removing the form or mold, and finally removing any of the coating adhering to the product.

6. The method of producing glossy enamel-like surfaces on articles formed of hydraulic cement mixtures, which comprises casting the mixtures in contact with surfaces coated with a bituminous material.

7. The method of producing glossy enamel-like surfaces on articles formed of hydraulic cement mixtures, which comprises casting the mixtures in contact with surfaces coated with a bituminous material that is solid at ordinary atmospheric temperatures.

PUTNAM DAVIS.